Patented Apr. 14, 1925.

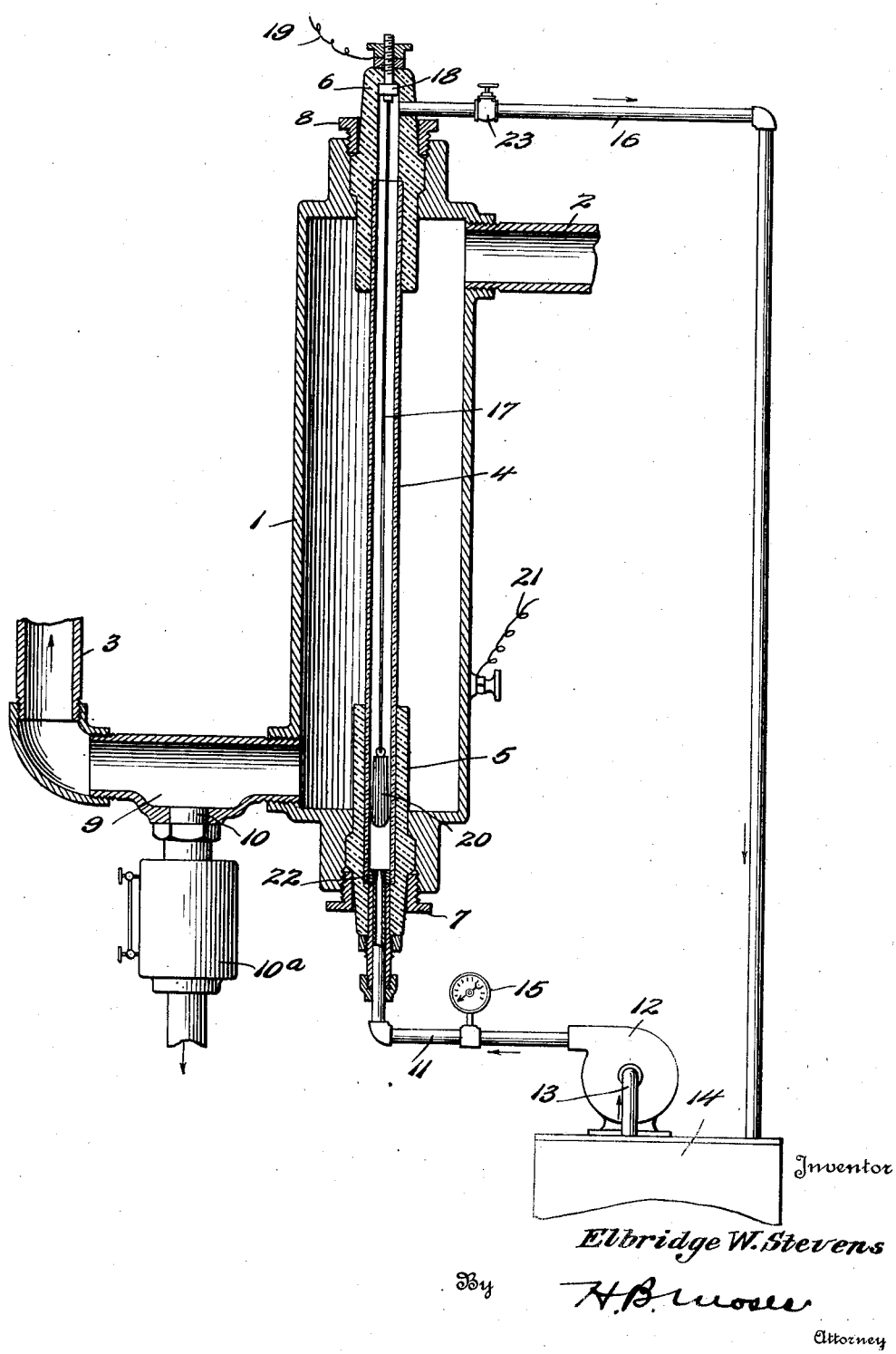

1,533,711

UNITED STATES PATENT OFFICE.

ELBRIDGE W. STEVENS, OF BALTIMORE, MARYLAND, ASSIGNOR TO THE PETROLEUM HYDROGENATION COMPANY OF AMERICA, INCORPORATED, OF WILMINGTON, DELAWARE, A CORPORATION OF DELAWARE.

APPARATUS FOR AND PROCESS OF TREATING WITH HIGH-TENSION CURRENTS.

Application filed November 20, 1924. Serial No. 751,130.

*To all whom it may concern:*

Be it known that I, ELBRIDGE W. STEVENS, a citizen of the United States, residing at Baltimore, in the State of Maryland, have invented certain new and useful Improvements in Apparatus for and Processes of Treating with High-Tension Currents, of which the following, taken in connection with the accompanying drawing, is a specification.

My invention relates to an apparatus to be used for the purpose of impressing a high tension electric current upon various liquids, vapors or gases, and primarily upon what are known as "cut" oils which contain a substantial amount, perhaps as much as 5% to 60% or more, of water in colloid-like solution or in emulsion, that is, in very intimate combination therewith, separation of the oil and water on standing not taking place, for the purpose of removing the water from the oil.

Purchasers of crude oil will not buy oil containing a substartial amount of water and require that practically all of this water be removed from the crude oil, or that the water content be so reduced that only a small percentage thereof remain in the oil before they will admit it to their pipe lines for transportation to their storage tanks.

Storage of such water containing oil in settling tanks either with or without the application of heat to effect separation of water, has not proven successful; and great difficulty has always been experienced in attempting to remove enough of the water to pass the pipe line companies' specifications by impressing upon such cut oils a high tension electric current of, say, from 6000 to 10,000 electric volts, depending upon the water content and other conditions. I have discovered that almost all of the water can be removed from "cut" oils by such electrical treatment, if the center electrode which carries the high tension charge be surrounded by a suitable gas or liquid which is kept separated from the "cut" oil, and particularly if such gas or liquid pass along said electrode in contact therewith.

My apparatus is illustrated in the accompanying drawing wherein the figure is a partially diagrammatic side view, partly in section and partly in elevation.

The apparatus comprises a tube 1 having an inlet branch 2 and an outlet branch 3. A smaller tube 4 of insulating material, such as glass or porcelain, is arranged within the tube 1 and preferably substantially centrally thereof, and it is supported by means of an insulator 5 into which the tube 4 fits at its lower end, and by an insulator 6 into which it fits at its upper end. The tube 4 may be suitably cemented into the insulators 5 and 6 to make the joints gas-tight; or, when desired, suitable stuffing glands 7 and 8 may be provided to make a tight joint between the insulators and the tube 1, and for certain purposes hereinafter referred to the tube 4 may fit slidably and loosely into the upper insulator 6. A basin 9 is provided in the outlet branch 3 for the collection of water or other matter which may be led off through the opening 10 in the bottom wall of the basin 9, and a trap $10^a$ may be connected with such opening for the removal of liquids. Both the upper and lower insulators 5 and 6 are hollow, and connected to the lower insulator 6 is an inlet pipe 11 fed by a pump 12 which draws its supply through the pipe 13 from a storage tank 14. For certain purposes hereinafter referred to, I provide a pressure gauge 15 in the pipe 11 to indicate the pressure therein. A pipe 16 connects the hollow part of the insulator 5 with the storage tank 14. Thus, the course of the material, that is, the liquid or gas in the tank 14, is by way of pipe 13, pump 12, pipe 11, into the tube 4, and then through the pipe 16 back into the tank 14. I provide an electrode 17 within and preferably centrally of the tube 4, the same being suspended from a suitable metal support 18 held in and passing through the upper portion of the insulator 6, and projecting therebeyond for the attachment of one of the leads 19 from the source of high voltage, whereby the electrode 17 is electrically connected with such source. This electrode 17 is a little shorter than the tube 4 and is held taut and centrally of the tube by a weight or bob 20, preferably an insulating bob, at the lower end thereof and within the tube or insulator. This bob is preferably fluted, as shown, to permit the fluids to pass by. The other lead from the electrical device is suitably connected to the tube 1 as at 21. The electrode wire is thus held taut and centrally of the tube by the weight of the bob without being subjected to strains due to contraction or bending due to expansion.

I have discovered that if the center electrode which carries the high tension charge, that is, the electrode 17, be surrounded by a gas, for example, natural gas, or by a liquid which is either non-conducting or semi-conducting, such, for example, as sulphuric acid or other material dissolved in a suitable liquid, such as water, to form the conducting electrolyte, the conductivity of which may be varied by varying the constituents thereof, and if such gas be separated from the body of the "cut" oil being treated by a tube of insulating material, that the separation of water from such oils is easily accomplished by subjecting the same to the alternating current.

An example of my process is as follows:

The intimate mixture of oil and water enters the apparatus through the inlet 2, and circulates through the tube 1 where the high tension alternating current is impressed upon it, and this current may be either of high or low frequency, as desired. Practically all of the water in such oils separates out from the oil, and on passing the basin 9 it is automatically drawn off therefrom by the trap 10$^a$, and an almost absolutely dry oil passes out through the outlet 3.

In treating such "cut" oils, it is necessary to circulate the gas or liquid in the tube 4 and to either cool or purify it in the tank 14, it being understood that said gas or liquid is circulated cyclically by the pump 12 to and from the tube 4 and the tank 14. In other words, my apparatus is set in continuous use by setting the pump 12 in operation, connecting up the source of high tension current, and starting the flow of the water-containing oil through my device, when dry oil will be found to issue forth therefrom. In case the water-containing oil should be of such a nature that it is not sufficiently dried by one treatment, it is quite apparent that the oil issuing from the outlet 3 may be led to the inlet 2 of another similar device for retreatment, but I find that this is generally not necessary.

In the practical embodiments of my apparatus, I have found that currents ranging from 2000 to 10,000 volts give very good results, but the nature of the material treated sometimes determines the best voltage to be desired. In such embodiments, I usually have the tube 4 about thirty-four (34) inches in length, with an outside diameter of seven-eighths ($\frac{7}{8}$) inch, the walls being about one-sixteenth ($\frac{1}{16}$) to one-eighth ($\frac{1}{8}$) of an inch thick. The electrode 17 is usually of platinum, nickel or nicrome wire of about eight-thousandths ($\frac{8}{1000}$) of an inch in diameter, and the tube 1 is usually about two and one-half (2½) inches inside diameter and has about twenty-two (22) inches of length effective for the electric treatment.

My invention is applicable to other uses, especially when slight alterations are made therein; for example, I may use it in order to give an electrostatic charge to gases or vapors to precipitate suspended matter therein, or I may use it to give an electric charge to gases or vapors when this is desired when there is no suspended matter to be separated out. For such purposes, I surround the electrode 17 with a neutral or non-neutral fixed gas, as may be required, such as hydrogen, nitrogen, etc., and the tube 4 may then be of a somewhat porous nature, such as alumdum, but the porosity thereof should be so low that the frictional resistance to the tendency of the gas to pass through the walls of the tube 4 will be greater than the relative difference in vapor pressure within and without such tube 4. In other words, the porosity should be as great as possible to offer the minimum resistance to the electric current, without, however, permitting substantial mixing of the gases which are inside of and the gases which are outside of the porous tube.

In the application of my apparatus, modified as above set forth to such purposes, the circulation of the gas in the tube 4 has three purposes; first, to keep the temperature of the electrode 17 below a point where injury would be possible in the event that high amperage in the high tension current be desired; second, to maintain an area of high dielectric strength in the immediate vicinity of and surrounding the electrode 17 irrespective of the electrical resistance of the material in the tube 1; and third, to keep the electrode 17 always free from deposit of foreign matter that the contents of the tube 1 might contain or develop.

My apparatus may also be used where it is desired to accurately measure and then electrify gas, and thereafter mix such gas uniformly with other material which may be within the tube 1 but outside of the tube 4, and this may be accomplished as follows:

The pump 12 draws a measured quantity of gas, for example, hydrogen or natural gas, or any other suitable gas, through the pipe 13 from the tank 14, and discharges the same into the pipe 11, at the end of which I provide a nozzle with the desired calibrated opening, as shown at 22. For this purpose I use the pressure gauge 15, maintaining a certain pressure in the pipe 11 by means of the pump 12, by reason of which an accurate predetermined quantity of gas will escape per unit of time from the nozzle 22 into the insulator 5, and thereby into tube 4. For such purposes, I do not cement the top of tube 4 into the insulator 6, to make a gas-tight joint, but on the contrary, I provide a loose, sliding fit therein; and I close off the outlet from the insulator 6 into the return pipe 16 in any suitable manner, as for example, by a valve 23. As a result, the gas issuing into and passing through the tube 4 will escape at the upper end thereof into the hollow part of the insulator and into the space within the tube 1, and outside of the tube 4, in a thin, annular stream, whereby it will readily mix with the gas entering through the inlet 2. The gas entering into the tube 1 through the tube 4 is thereby twice subjected to the electrical current: once in its pure state during its upward travel through the tube 4, and again in its downward path through the tube 1 when mixed with the other gases.

My apparatus is of still further application, as for the treatment of gases or vapors for the precipitation of matter suspended therein, and for this purpose I use a unidirectional electric current and remove the precipitated matter through the outlet 10, the trap 10ᵃ being removed and not used for this purpose, or, if desired, another suitable means of disposal may be substituted therefor.

A still further application of my apparatus is to impart an electric charge to a gas or vapor entering through the inlet 2, and for this purpose the outlet 10 is closed off in a suitable manner, the treated gases or vapors finding exit through the outlet 3.

My apparatus may also be further modified, as may be the uses to which it is put.

The word "armored" as used in some of the claims has about the same as its ordinary meaning in the electrical art irrespective of whether or not there may be insulating solid material between the conducting wire and its armor.

What I claim is:

1. In an apparatus of the class described, a device for containing gases and electrodes connected with the poles of a source of high potential current, one of said electrodes being insulated.

2. In an apparatus of the class described, a device for containing gases and electrodes connected with the poles of a source of high potential current, one of said electrodes being insulated by a tube containing a fluid.

3. In an apparatus of the class described, a device for containing gases and electrodes connected with the poles of a source of high potential current, one of said electrodes being insulated by a tube containing gases.

4. In an apparatus of the class described, a device for containing gases, and electrodes connected with the poles of a source of high potential current, one of said electrodes being insulated by a tube containing flowing gases.

5. In an apparatus of the class described, a device for the passage of gases and electrodes connected with the poles of a source of high potential current, one of said electrodes being insulated, and means for causing gases to pass through said device.

6. In an apparatus of the class described, a device for the passage of gases and electrodes connected with the poles of a source of high potential current, one of said electrodes being insulated by a tube containing a fluid, and means for causing gases to pass through said device.

7. In an apparatus of the class described, a device for the passage of gases and electrodes connected with the poles of a source of high potential current, one of said electrodes being insulated by a tube containing gases, and means for causing gases to pass through said device.

8. In an apparatus of the class described, a device for the passage of gases and electrodes connected with the poles of a source of high potential current, one of said electrodes being insulated by a tube containing flowing gases.

9. In an apparatus of the class described, a device for containing the material to be treated, an inlet to said tube for the material to be treated, an outlet from said tube for the treated material, means to remove separated impurities, and an electrode within said tube connected to a source of high potential current, said electrode being separated by a tube surrounding it from the material being treated.

10. In an apparatus of the class described, a device for containing the material to be treated, an inlet to said tube for the material to be treated, an outlet from said tube for the treated material, means to remove separated impurities, and an electrode within said tube connected to a source of high potential current, said electrode being separated by a tube surrounding it and by a fluid within said tube from the material being treated.

11. In an apparatus of the class described, a device for containing the material to be treated, an inlet to said tube for the material to be treated, an outlet from said tube for the treated material, means to remove separated impurities, an electrode within said tube connected to a source of high potential current, said electrode being separated by a tube surrounding it from the material being treated, and means to circulate gas along said electrode.

12. In a device for causing the breaking of oil-water emulsions, an upright tube, insulators at and passing through each end of the tube, gas-tight connections between said insulators and tube, said insulators having passages therethrough forming supports for a tube within said tube, an inlet to said outer tube for the entry of the material to be treated, an outlet from said outer tube for the egress of treated material, means in said outlet for the removal of water, a wire electrode within said inner tube, a support for said electrode and in electrical contact therewith of conducting material and passing through the upper insulator and supported thereby and forming a connection for a source of high potential current, a pipe connection to the upper insulator, a pipe connection to the lower insulator, and means for causing circulation of material through said pipes.

13. In a device for causing the breaking of oil-water emulsions, an upright tube, insulators at and passing through each end of the tube, gas-tight connections between said insulators and tube, said insulators having passages therethrough and forming supports for a tube within said tube, an inlet to said outer tube for the entry of the material to be treated, an outlet from said outer tube for the egress of treated material, trap means in said outlet for the removal of water, a wire electrode within said inner tube, a support for said electrode and in electrical contact therewith of conducting material and passing through the upper insulator and supported thereby and forming a connection for a source of high potential current, a pipe connection to said upper insulator, a pipe connection to the lower insulator, and means for causing circulation of material through said pipes.

14. In a device for causing the breaking of oil-water emulsions, an upright tube, insulators at and passing through each end of the tube, gas-tight connections between said insulators and tube, said insulators having passages therethrough and forming supports for a tube within said tube, an inlet to said outer tube for the entry of the material to be treated, an outlet from said outer tube for the egress of the treated material, means in said outlet for the removal of water, a wire electrode within said inner tube and supported centrally thereof, a support for said electrode and in electrical contact therewith of conducting material and passing through the upper insulator and supported thereby and forming a connection for a source of high potential current, a bob at the lower free end of said wire electrode, a pipe connection to said upper insulator, a pipe connection to the lower insulator, and means for causing circulation of material through said pipes.

15. In a device for causing the breaking of oil-water emulsions, an upright tube, insulators at and passing through each end of the tube, gas-tight connections between said insulators and tube, said insulators having passages therethrough and forming supports for a tube within said tube, an inlet to said outer tube for the entry of the material to be treated, an outlet from said outer tube for the egress of treated material, trap means in said outlet for the removal of water, a wire electrode within said inner tube and supported centrally thereof, a support for said electrode and in electrical contact therewith of conducting material and passing through the upper insulator and supported thereby and forming a connection for a source of high potential current, a bob at the lower free end of said wire electrode, a pipe connection to said upper insulator, a pipe connection to the lower insulator, and means for causing circulation of material through said pipes.

16. A high potential electrode for causing physical or chemical changes, comprising an elongated armored wire.

17. A high potential electrode for causing physical or chemical changes comprising an elongated wire armored by a tube.

18. A high potential electrode for causing physical or chemical changes comprising an elongated wire armored by a tube, the internal diameter of which is substantially greater than the external diameter of the wire.

19. A high potential electrode for causing physical or chemical changes comprising an elongated wire armored by a tube containing gas.

20. A high potential electrode for causing physical or chemical changes comprising an elongated wire armored by a tube containing neutral gas.

21. A high potential electrode for causing physical or chemical changes comprising an elongated wire armored by a tube containing flowing gas.

22. A high potential electrode for causing physical or chemical changes comprising an elongated wire armored by a tube containing flowing neutral gas.

23. The process of separating out the water in oil-water emulsions which comprises subjecting the emulsion to a high voltage current by means of electrodes, one of which is separated from the emulsion by a layer of gas.

24. The process of separating out the water in oil-water emulsions which comprises subjecting the emulsion to a high voltage current by means of electrodes, one of which is separated from the emulsion by a layer of neutral gas.

25. The process of separating out the water in oil-water emulsions which comprises subjecting the emulsion to a high voltage current by means of electrodes, one of which is separated from the emulsion by a layer of flowing gas.

26. The process of separating out the water in oil-water emulsions which comprises subjecting the emulsion to a high voltage current by means of electrodes, one of which is separated from the emulsion by a layer of flowing neutral gas.

27. The process of separating out the water in oil-water emulsions which comprises subjecting the emulsion to a high voltage current by means of electrodes while flowing the same along one of the electrodes which is separated from the emulsion by a layer of gas.

28. The process of separating out the water in oil-water emulsions which comprises subjecting the emulsion to a high voltage current by means of electrodes while flowing the same along one of the electrodes which is separated from the emulsion by a layer of neutral gas.

29. The process of separating out the water in oil-water emulsions which comprises subjecting the emulsion to a high voltage current by means of electrodes while flowing the same along one of the electrodes which is separated from the emulsion by a layer of flowing gas.

30. The process of separating out the water in oil-water emulsions which comprises subjecting the emulsion to a high voltage current by means of electrodes while flowing the same along one of the electrodes which is separated from the emulsion by a layer of flowing neutral gas.

31. The process of separating out the water in oil-water emulsions which comprises flowing the same interiorly of an electrode and exteriorly of another electrode, the interior electrode being separated from the emulsion by a layer of gas.

32. The process of separating out the water in oil-water emulsions which comprises flowing the same interiorly of an electrode and exteriorly of another electrode, the interior electrode being separated from the emulsion by a layer of neutral gas.

33. The process of separating out the water in oil-water emulsions which comprises flowing the same interiorly of an electrode and exteriorly of another electrode, the interior electrode being separated from the emulsion by a layer of flowing gas.

34. The process of separating out the water in oil-water emulsions which comprises flowing the same interiorly of an electrode and exteriorly of another electrode, the interior electrode being separated from the emulsion by a layer of flowing neutral gas.

35. The process of separating out the water in oil-water emulsions which comprises flowing the same interiorly of an electrode and exteriorly of another electrode which is substantially centrally thereof, the interior electrode being separated from the emulsion by a layer of gas.

36. The process of separating out the water in oil-water emulsions which comprises flowing the same interiorly of an electrode and exteriorly of another electrode which is substantially centrally thereof, the interior electrode being separated from the emulsion by a layer of neutral gas.

37. The process of separating out the water in oil-water emulsions which comprises flowing the same interiorly of an electrode and exteriorly of another electrode which is substantially centrally thereof, the interior electrode being separated from the emulsion by a layer of flowing gas.

38. The process of separating out the water in oil-water emulsions which comprises flowing the same interiorly of an electrode and exteriorly of another electrode which is substantially centrally thereof, the interior electrode being separated from the emulsion by a layer of flowing neutral gas.

ELBRIDGE W. STEVENS.